G. E. MAXWELL.
AUTOMATIC CLUTCH RELEASE.
APPLICATION FILED AUG. 10, 1920.
1,421,521.
Patented July 4, 1922.
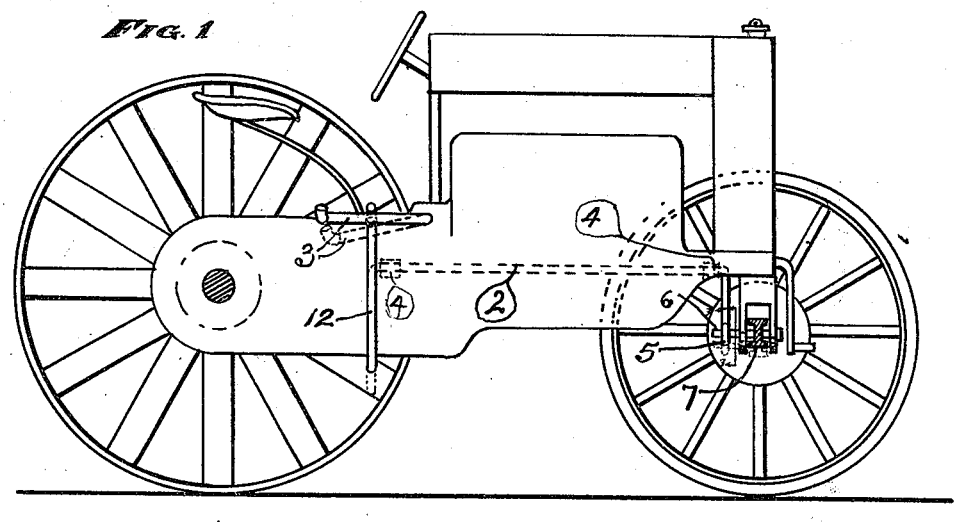
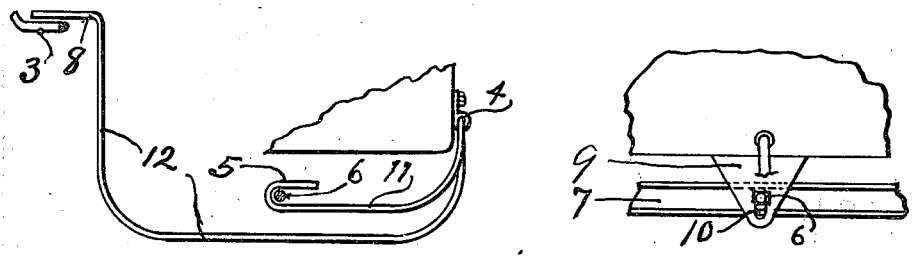
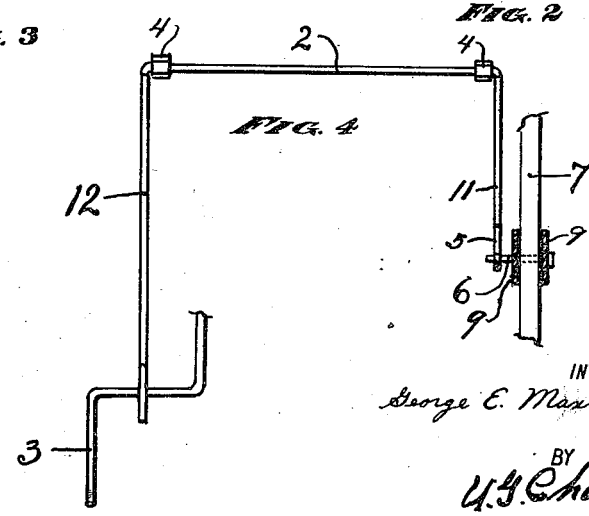
INVENTOR
George E. Maxwell
BY
U. G. Charles
ATTORNEY

UNITED STATES PATENT OFFICE.

GEORGE E. MAXWELL, OF NEW ULYSSES, KANSAS.

AUTOMATIC CLUTCH RELEASE.

1,421,521.  Specification of Letters Patent.  Patented July 4, 1922.

Application filed August 10, 1920. Serial No. 402,713.

*To all whom it may concern:*

Be it known that I, GEORGE E. MAXWELL, a citizen of the United States, and a resident of New Ulysses, in the county of Grant and State of Kansas, have invented a certain new and useful Automatic Clutch Release, of which the following is a specification.

My invention relates to an automatic release for tractor clutches and can be applied to any make of tractors that are now being commonly employed.

The object of my invention is to provide simple means of releasing the clutch when the tractor is overtaxed with a load at which time the inclination is for the tractor to overturn rearward by its own motive power on the axis of the rear axle, which action is very dangerous for the operator and destructive of the tractor or other machinery attached thereto.

The invention will be better understood from references to the accompanying drawings in which corresponding numerals refer to corresponding parts throughout, in which;—

Fig. 1 is a side view of a tractor with parts removed for convenience of illustration. Fig. 2 is a fragmentary front view showing the axle and saddle bearing with elongated hole to allow the tractor body to separate slightly from the axle before raising said axle and front wheels. Fig. 3 is an end elevation of my disengaging device viewed from a section point on line A in Fig. 2, looking in the direction of arrow. Fig. 4 is a top or plan view without showing any part of the tractor except clutch pedal lever 3.

In Fig. 1, 2 is a rocker shaft with arms at each end, the front arm 11 as shown at 5, and pivotally engaged by pin 6 and the rear arm 12 is adapted to engage the clutch pedal lever 3 of the tractor. Said rocker crank shaft is hinged to the housing of the engine as shown at 4 and the end of front arm 11 is looped as shown at 5, said loop is engaged by a pin 6 which is firmly attached to the front axle 7.

The end of arm 12 is bent at a right angle as shown at 8 and adapted to engage the clutch pedal lever 3, the bearing 9 is attached to the axle 7 resting on the pin 6 and the object of the elongated slots is to allow the front part of the tractor body to move upward to the length of said slot without lifting the front wheels, and by this means the rocker shaft and arms are brought into action releasing the clutch disengaging the engine at which time the front of the tractor drops back to its normal position and by this means the tractor is prevented from turning over backwards by its own motive power.

Such modifications may be employed as lie within the scope of the appended claims.

Having fully described my invention what I now claim as new and desire to secure by Letters Patent is—

1. A safety attachment for tractors, comprising a rock-shaft, a front arm on said rock-shaft, a horizontal slot in the end of said front arm, an elongated pin adapted to form a pivot for the front axle and project through said slot, a downwardly arched rear arm on the rock-shaft extending parallel to the front arm, said rear arm being bent upwardly and having a hook at the end of the upwardly bent portion, for engagement with the clutch pedal lever of the tractor.

2. In combination with a tractor, a pair of journal bearings secured to one side of the tractor housing in horizontal alignment, a rock-shaft guided in said bearings, a horizontal extending front arm on the rock-shaft at the level of and behind the front axle, a slot in the end of said front arm a rearwardly projected pin passing through the center of the front axle and through said slot, and a rear arm on said rock-shaft, said rear arm extending down and laterally under the tractor housing, thence up at the opposite side of the housing, said rear arm comprising a hook which engages over the clutch pedal lever for the purpose specified.

GEORGE E. MAXWELL.

Witnesses:
 M. Y. CHARLES,
 J. R. JAMES.